("12") United States Patent  
Lovitt et al.

(10) Patent No.: US 9,678,573 B2
(45) Date of Patent: Jun. 13, 2017

(54) INTERACTION WITH DEVICES BASED ON USER STATE (75) Inventors: Andrew W. Lovitt, Redmond, WA (US); Michael Hall, Snohomish, WA (US); Gordon Free, Freeland, WA (US); Stefanie Lyn Tomko, Bellevue, WA (US); Jason R. Farmer, Snohomish, WA (US); Nathan M. Rau, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 13/562,115

(22) Filed: Jul. 30, 2012

(65) Prior Publication Data

US 2014/0028542 A1    Jan. 30, 2014

(51) Int. Cl.
*G06F 1/00* (2006.01)
*G06F 3/01* (2006.01)

(52) U.S. Cl.
CPC .................... *G06F 3/017* (2013.01)

(58) Field of Classification Search
CPC .......... G06F 1/00; G06F 3/0488; G06F 3/017; G06F 3/013
See application file for complete search history.

(56) References Cited

U.S. PATENT DOCUMENTS

| 6,668,221 | B2 | 12/2003 | Harter, Jr. et al. |
| 7,225,414 | B1* | 5/2007 | Sharma et al. ............... 715/863 |
| 7,463,961 | B2 | 12/2008 | Powers et al. |
| 8,320,884 | B1* | 11/2012 | Khanna et al. ............... 455/411 |
| 8,677,284 | B2* | 3/2014 | Aguilar ........................ 715/863 |
| 2008/0126661 | A1 | 5/2008 | Lin et al. |
| 2008/0291032 | A1 | 11/2008 | Prokhorov et al. |
| 2009/0225036 | A1 | 9/2009 | Wright |
| 2010/0297929 | A1 | 11/2010 | Harris |
| 2012/0058783 | A1* | 3/2012 | Kim ...................... G06F 1/1626 455/456.2 |
| 2012/0095643 | A1 | 4/2012 | Bose et al. |

(Continued)

OTHER PUBLICATIONS

Amditis, Angelos et al., "Design and Development of an Adaptive Integrated Driver Vehicle Interface," AIDE final workshop and exhibition, (downloaded from: http://www.aide-eu.org/pdf/final_workshop/day1/aide_day_1_sp3-overview_v5.pdf), Apr. 15-16, 2008, (27 pages), Gothenburg.

(Continued)

*Primary Examiner* — Michael Faragalla
(74) *Attorney, Agent, or Firm* — Fogarty LLP (57) ABSTRACT A device identifies users who is trying to interact with it and monitors their state. Using this user state information, the device dynamically adjusts a user interface, speech grammars, screen flow, input options, and the like to tailor interaction with the device to the user. The user interface and device interaction may also be influenced by user-specific settings or profiles. The device may prevent or allow user interaction with the device based on the user's state, such as a position relative to the device. For example, the device may prevent or allow the user from using a set of speech or gesture commands or other interaction sets based on the user's position or relative location.

19 Claims, 5 Drawing Sheets

(56) References Cited

U.S. PATENT DOCUMENTS

2013/0096771 A1* 4/2013 Srenger .......................... 701/36

OTHER PUBLICATIONS

Pompei, F. Joseph et al., "An Automobile-Integrated System for Assessing and Reacting to Driver Cognitive Load," Proceedings of the 2002 International Congress on Transportation Electronics—Convergence, (downloaded from: http://xenia.media.mit.edu/~taly/publications/convergence02.pdf), Oct. 21, 2002, (6 pages).
"International Search Report & Written Opinion for PCT Patent Application No. PCT/US2013/052442", Mailed Date: Sep. 30, 2013, Filed Date: Jul. 29, 2013, 10 Pages.

* cited by examiner

INTERACTION WITH DEVICES BASED ON USER STATE

BACKGROUND

Devices may limit user interaction under certain conditions. Devices may limit interaction with certain users to reduce distractions or for privacy concerns. In order to enforce these limitations, the device must determine when to allow distracting, personal, or other restricted content to be displayed. In existing systems, it is difficult to identify the user who is interacting with a device, such as which user is looking at the device display or attempting to provide inputs to the device. Without specifically identifying who is interacting with the device, the device cannot make intelligent decisions regarding the content to be displayed or the inputs to accept.

In production vehicles, interaction with the navigation/entertainment screen is often limited by the operating state of the vehicle. For example, it is common for vehicles to limit interaction with some devices, such as the navigation system, when the vehicle is moving to reduce driver distraction. For instance if the car is in park the driver can input navigation information or pair the system to a Bluetooth phone. However, these two functions are disabled when the car is in motion.

Several pre-production devices have been demonstrated that lock a vehicle information screen based on a user's proximity to sensors in the front seat of the vehicle. However, this solution can be circumvented easily if the driver, for example, reaches around as if he or she were sitting in the passenger seat. This creates a situation in which attempts to overcome lock-out mechanisms add to driver distraction and make the conditions very dangerous.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments use a depth camera or regular camera to identify the users and to monitor state of the user who is trying to interact with the device. For example, the system may use skeletal tracking to determine the location and state of the user. Body position monitoring, eye tracking, and gaze detection may also be used to determine who is interacting with a device and their present state. Using this information, the system dynamically adjusts the user interface, speech grammars, screen flow, input options, and the like to tailor interaction with the device to the user. The user interface and device interaction may also be influenced by user-specific settings or profiles.

In various embodiments, a device would either prevent or allow user interaction with the device based on the user's position relative to the device. For example, the device may prevent or allow the user from using speech or a set of speech commands based on their position or relative ability. The device may further adjust speech grammars based on the user's position or relative ability to interact with the device. The device may adjust a user interaction configuration based on whether or not another user is within interaction distance of a device. For example, the device may enable/disable display content and menus based on the gaze of the driver combined with the context of their position relative to the device.

In one embodiment, user interactions with a device are detected, a user state is identified; and the manner by which the device interacts with the user is modified based upon the user state. The user state may be, for example, a position relative to the device. One or more sensors may be used to identify the user state. The sensors may include one or more of cameras, microphones, acoustic sensors, sonar sensors, radar sensors, light sensors, electronic device detectors, skeletal tracking devices and algorithms, and user physiological sensors.

The device modifies how it interacts with the user by selecting a user interface context. The user interface context may be, for example, a user interface menu, a screen flow, an arrangement of user interface components, a menu order, a group of inputs on a display, or other context. In embodiments that allow the user to interact with the device using spoken commands, the user interface context may be a speech context that includes a language model and/or other interaction options for a spoken dialog system. For example, a speech detector may use an entire grammar set of all words that it is capable of recognizing or may use a subset of a few select words that are key for a particular situation.

The device may further modify how it interacts with the user by selecting an interaction set that defines one or more allowed interactions between the user and the device. The allowed interactions may include, for example, one or more grammars used to interpret user speech inputs, vocabularies for text-to-speech outputs, gestures, human-machine interface, display buttons, display menus, display icons, screen ordering, or other user-device interaction. The interaction set may also be a user physiological set that is used to monitor physiological factors of the user.

In some embodiments, the device modifies how it interacts with the user by disabling one or more device capabilities or selecting a subset of all available user interactions as allowed inputs and outputs for the device. The device capabilities may include, for example, one or more of functions, displays, buttons, menus, speakers, inputs, and outputs.

One embodiment of a device for employing the methods and techniques described herein comprises a user interface for receiving user inputs, one or more sensors for determining the user's location relative to the device, and a user-interface controller adapted to modify the user interface to use a set of selected inputs based upon the user's relative location. The one or more sensors may further determine a second user's location relative to the device. The user-interface controller may be adapted to modify the user interface to use a second set of selected inputs based upon the second user's relative location.

DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

A device may adjust the allowed level of user interaction based upon the user's state. The user's state may include, for example, the user's assigned tasks and responsibilities or the user's position and location relative to the device. In one embodiment, a device tracks the driver and passengers in a vehicle and uses information about these individuals to tailor the level of interaction allowed for each user. The user's position and location within the vehicle may also be combined with other state-tracking devices, such as user gaze detection, to further refine the interaction allowed by the device. The interactions, such as content presented on a display, available to each user may be based on a selected distraction level. The distraction level represents how much of the user's attention is allowed to be directed to the device. A driver will typically have a low distraction level (i.e., the driver should not be distracted with anything non-important while operating the vehicle), but passengers who can interact with the device without endangering the vehicle will have a relatively high distraction level. Depending on their positions in the vehicle, different passengers may have different distraction levels.

Depending upon the distraction level, the device may adjust its interaction with different users. Physical, audio, visual or other interactions may be adjusted by the device. For example, to avoid distracting a driver, audio information may be targeted at passengers only (e.g., only the passengers can receive audio alerts for new text messages) or the content of a display may change depending on whether the driver is or passenger is looking at the device. If the driver looks towards the infotainment system, the system will present simpler information with easier to navigate menus. Extra, non-critical information and inputs may be removed from the display to avoid diverting the driver's attention to the infotainment system. On the other hand, if a passenger gazes at the infotainment system, then more information could be displayed and a more complex interaction options may be available.

Figure 1:
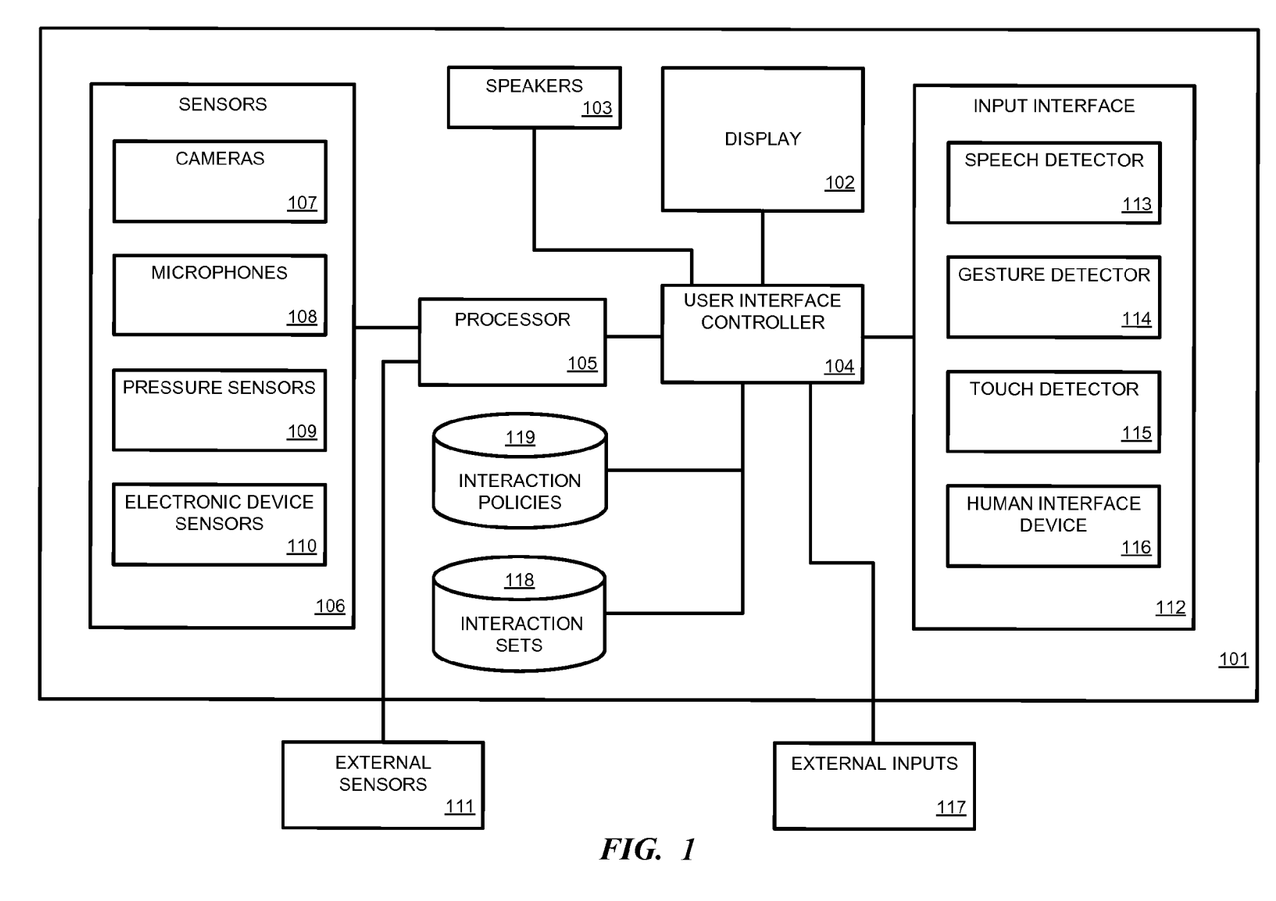
FIG. 1 is a high level block diagram of a system that adjusts interaction based on user position or action.

FIG. 1 is a high level block diagram of a system 101 that adjusts interaction based on user position or action. System 101 includes display 102 and speakers 103 that provide audiovisual information to the user. Display 102 may be a self-contained unit, such as a CRT, LED, or LCD monitor, or a projection display, such as a CRT, LCD or DLP projector. Speakers 103 may be any device that provides speech, music, tones, or other sounds to the user. A user interface controller 104 provides content to display 102. The content may come from applications or software running on a processor 105, for example.

One or more sensors 106 are used to detect user state information, such as a user's position and location relative to the system. Camera sensors 107 may include, for example, any device that captures visible, infrared, and/or ultraviolet light and generates one or more images, such as a still, video, or depth camera or light/dark sensor. Cameras 107 may be used to generate images that can be used by processor 104 to determine the position or location of a user. Additional visual information, such as a user's point of focus and gaze detection, may be determined using cameras 107 as described in pending U.S. patent application Ser. No. 13/474,723, filed May 18, 2012 and titled "Interaction and Management of Devices Using Gaze Detection," the disclosure of which is hereby incorporated herein in its entirety. For example, cameras 107 and processor 105 may operate as a gaze detector that monitors the user's body, head, eye, and/or iris position to determine the user's line of sight and/or point of focus. Gaze information, which may include either or both line of sight data (e.g. azimuth and elevation angles that indicate in which direction the user is looking) and point of focus data (e.g. an identity of a particular object or point in space on which the user is focused).

Microphone sensors 108 may include any monaural, stereophonic, single-channel, or multi-channel audio capture device. Microphones 108 may be used, for example, to detect user speech that is processed as a command or input or used by processor 104 to determine a user's location. Pressure sensors 109 include any device that detects force or pressure. Pressure sensors 109 may be used to detect where a user is sitting, such as a weight sensor in a seat, or what a user is holding, such as a sensor that detects a user's grip or finger position on a steering wheel, haptic controller, or joystick. Electronic device sensors 110 may be used to detect the presence and/or location of electronic devices, such as Bluetooth® sensors, cellular telephone detectors, or other sensors that monitor transmissions or radiation from electronic devices.

Sensors 106 may be integral to or specially adapted for system 101. Alternatively or additionally, external sensors 111 may be used with system 101 to provide information to processor 104. External sensors 111 may perform functions that are similar to sensors 107-110 or may provide additional type of information that is relevant and useful in determining a user's position, location, and state. External sensors 111 may be specially adapted for system 101 or may be aftermarket or third-party sensors that provide information in a format useable by system 101.

Input interface 112 allows users to provide inputs to system 101. Inputs may be, for example, one or more of speech, gestures, touches, or other actions. A speech detector 113 may include a microphone that captures the user's sounds. These sounds are then compared to a dictionary or grammar of known words to identify the user's spoken inputs or commands. The spoken inputs or commands are provided to interface controller 104 for further processing. A gesture detector 114 may include cameras or other image detection device that captures a user's motions or gestures, such as arm, hand, head, leg, or body motions. These motions or gestures are compared to a library of known gestures and recognized gestures are provided to user interface controller 104. A touch detector 115 may be integral to display 102, which may be a touch screen, or may be a separate component, such as a drawing pad, tablet, or haptic controller. Touch detector 115 senses the user's physical actions, such as touching or swiping a touch screen with a hand or one or more fingers. Touch detector 115 may also sense shaking, twisting, or otherwise moving a haptic controller. These touch inputs may be compared to sets of known motions or actions. Recognized touch or action inputs are provided to user interface controller 104. In some embodiments, some or all of sensors 106 may overlap with input interface 112 and the same sensor may be used both to detect a user's position, location, and state as well as to receive inputs from the user.

User gaze information may also be provided to the user interface controller 104 as an input. System 101 may receive user inputs from a gaze detector, such as cameras 107 or an external gaze detector, to determine a user's point of focus on a menu, display item, or other input. Other input devices, such as any human interface device (HID) 116, may be used with system 101 as appropriate. The HID 116 may be a keyboard, keypad, touchpad, trackball, pointing device, controller, or physiological sensor, such as a blood pressure, pulse, respiration, temperature, skin resistivity or other sensor. Additionally, system 101 may also receive user inputs from external sources 117. In some embodiments, system 101 does not have its own input interface 112 and must use an external user input 117.

System 101 may include a memory or other storage device for storing interaction sets 118 for use with input interface 106. The instruction sets 118 may represent menu selections, display options, or groups of buttons offered via a user interface. Each input detector 113-116 may be capable of detecting many different inputs. For example, speech detector 113 may use a dictionary or grammar set of sounds that it recognizes as input words, gesture detector 114 may use a library of known gestures, and touch detector 115 may use sets of known motions or actions. Interaction sets 118 may include an entire dictionary, grammar, or library for each input as well as subsets of the whole set. The subsets may represent different combinations of selected inputs for each detector. For example, speech detector 113 may use an entire grammar set of all words that it is capable of recognizing or may use a subset of a few select words that are key for a particular situation. The entire grammar set may include hundreds of words, but the subset may comprise only a few words. For example, one subset may include just the words "on" and "off," and another subset may include just the words "start," "stop," "rewind," "fast forward," and "eject."

A memory or storage device stores interaction policies 119 that user interface controller 104 uses to determine which context or interaction set 118 to use at a given time or under certain conditions. The interaction policies may identify, for example, which input interface 112 and which interaction set 118 to use when different users and user states are detected. The selected interaction set 118 and interaction policy 119 are dependent on the expected actions of the user, which may be a function of whether the user is a driver or passenger. These allowed interactions may be changed or augmented by system policies. For example, if there is no passenger in the vehicle, then the driver may have access to additional functions that would otherwise be only available to a passenger.

In an example embodiment that is not intended to limit the scope of the invention, system 101 may be used in a vehicle. Display 102 may be part of the instrument cluster or a heads up display (HUD). Sensors 106 are used to identify the number and location of users in the vehicle. Each user may be assigned a particular interaction set 118 and/or interaction policy 119 based upon his or her position or role in the vehicle, such as driver, front seat passenger, or backseat passenger. User interface controller 104 may change display 102 to present a context selected for the user. Sensors 106 may also be used to determine which user is interacting with the system. For example, when touch detector 115 detects that a button has been pressed by a user, cameras 107 may be used for skeletal tracking of the user to determine which specific user provided the input. In one embodiment, skeletal tracking links the user's finger-hand-arm-body to determine where the user is located. In this way, when a button is pressed, such as a soft button on a display, skeletal tracking will allow the system to connect the button-push to a user in the driver's seat, front passenger seat, or rear passenger seat. This prevents one user from fooling the system into accepting inputs that are only allowed for other users. If the driver leans over into the passenger seat area and pushes a button on the display, skeletal tracking will determine that the user is actually in the driver's seat and will only allow interaction sets and policies that are available to the driver.

When the user is identified, the user interface controller 103 may further select an interaction set 118 that is optimized for that user. For example, by identifying the area of a display that the driver is focused on—based on a menu selection or gaze detection—the system can respond with information that the user expects or is likely to need. For example, processor 105 may be running a navigation application that presents navigation information, such as a map, on display 102. A gaze detector analyzes the drivers head and eye position of the driver and front seat passenger. When gaze detector determines that the driver is looking at the map display 102, it sends information to user interface controller 104 to identify the map as the driver's point of focus. User interface controller 104 then selects appropriate interaction sets 118 for the map display or for a navigation context. Alternatively, if the gaze detector determines that the front-seat passenger is looking at the map display 102, then user interface controller 104 selects an interaction set 118 that is appropriate for the passenger. The driver interaction set may generate a simplified display, such as streets and limited navigation directions and text, and accept limited inputs, such as changes to map scale or selecting a pre-programmed destination. The passenger interaction set may generate more complex displays, such as detailed maps showing points of interest and weather overlays in addition to streets, and may accept a full set of inputs, such as allowing new destination or search addresses to be entered or allowing configuration of the system.

Recognition of multiple users and identification of which user is providing inputs allows the system to serve multiple users simultaneously. Sensors 106 allow the system to determine which user, if any, is speaking and/or is not speaking to the system. For example, if neither user is looking at a map display 102 and one of the users says "find home," then the system may not respond to these words as a navigation command. Interaction policies 119 can be used to establish rules identifying when certain potential inputs will be treated as commands. A navigation policy may require a user to look at a map display in order to initiate certain commands, for example.

The interaction sets and policies may be used to simplify display elements and menus for selected users. The driver may have a different flow of display elements and menus. User interface elements may be adjusted as described in pending U.S. patent application Ser. No. 13/316,211, entitled "Adjusting User Interface Screen Order and Composition," filed Dec. 9, 2011, the disclosure of which is hereby incorporated by reference herein in its entirety.

Interaction policies may extend to grammars. In one embodiment, devices determine the appropriate context for a user interface or determine the available user inputs based on the user's state, which may include the user's position in the vehicle and location relative to the device. The available user inputs may include, for example, instruction sets, grammars, and recognition actions. The grammars may represent groups of words or speech inputs that the device will detect. The recognition actions may represent tactile inputs to a touch screen, haptic inputs to a device, or user gestures or motions that the device will recognize. An interaction policy may state that the driver cannot input destinations into the navigation system while the vehicle is moving. Thus, the grammar for a speech recognition engine would apply this policy by not recognizing navigation destination commands from the driver when the vehicle is moving. In another embodiment, any driver inputs may be restricted while the vehicle is in motion and the interaction set may prevent the use of conversational interactions that require confirm or deny requests from the speech engine. Typically, the passenger however may interact with the device without regard to vehicle movement and, therefore, a different grammar is used for the passenger to allow more complicated commands. These complicated commands may be more error prone or time consuming, but the passenger has the ability to focus on the device without endangering the vehicle or others.

Figure 2A:
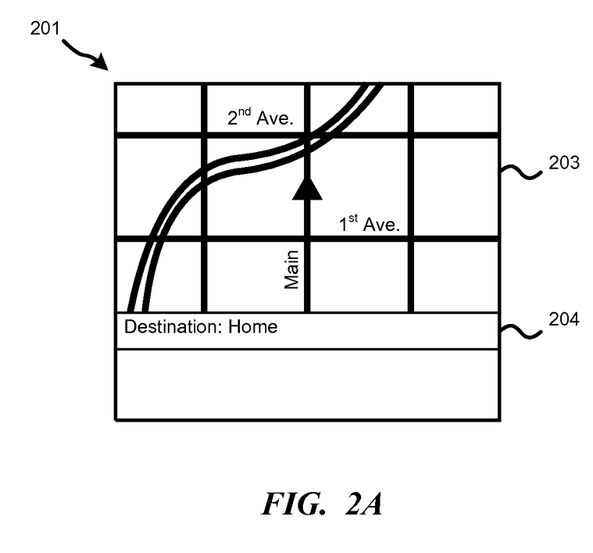
FIGS. 2A and 2B are example embodiments of a navigation display in a vehicle that are adapted for different users.
Figure 2B:
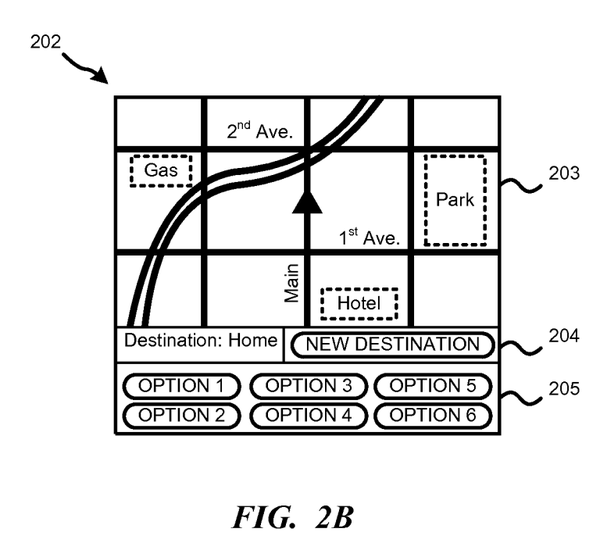

FIGS. 2A and 2B are example embodiments of a navigation display in a vehicle that are adapted for different users. Display 201 is a simplified display that is adapted for a driver. When the navigation system determines that the user is the driver, a driver-oriented interaction set is selected. This interaction set will determine what elements should be provided to the driver-user. Display 202 is a more complex display that is adapted for a passenger in the vehicle. When the navigation system determines that the passenger is using the system, then a passenger-oriented interaction set is selected.

Both displays include a map area 203 and an information area 204. Display 202 also includes an additional option area 205. The map area 203 on driver-display 201 is simplified and only shows a current location and surrounding streets. This display has only basic functionality and reporting information and is uncluttered and easy to read. On passenger-display 202, the map area 203 is more detailed and adds points of interest, such as gas stations, hotels, restaurants, parks, schools, and other locations. The passenger-oriented interaction set may also allow the passenger to select the points of interest as destinations or to request additional information about the points of interest.

The information area 204 on driver-display 201 only shows destination information. On passenger-display 202, the information area 204 includes an option to allow the passenger to select a new destination while the vehicle is in motion. Because the passenger has a higher distraction level, he or she can spend time focusing on the destination-selection task without endangering the vehicle.

Additional option area 205 is not available to the drive on display 201 because the driver has a low distraction level. Therefore, the interaction set does not offer these additional options to the driver. However, the passenger interaction set generates a number of options in area 205 that the passenger may select, such as changes to the navigation system configuration, additional destination features, advanced search features, and the like. The separate interaction sets minimize the cognitive load on the driver, but allow the passenger to use more advanced interactions when the car is in motion.

Figure 3A:
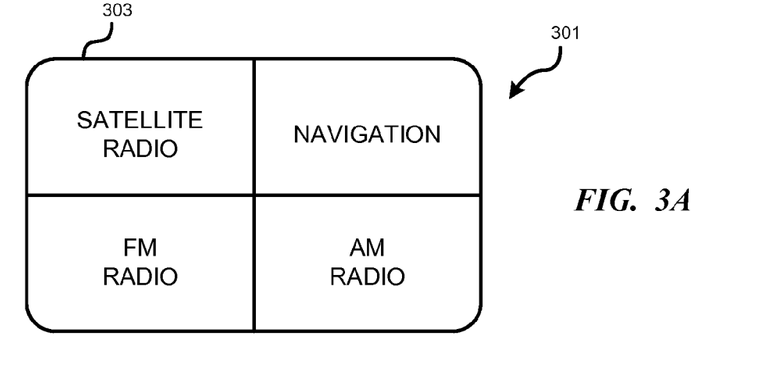
FIGS. 3A and 3B illustrate different menu displays that are selected for different users according to one embodiment.
Figure 3B:
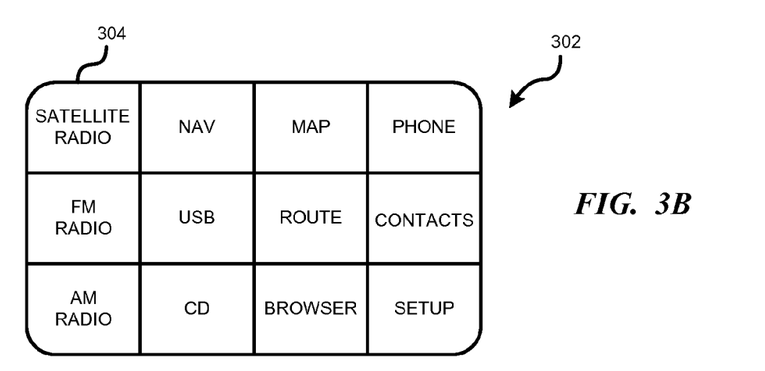

FIGS. 3A and 3B illustrate different menu displays that are selected for different users according to one embodiment. Display 301 illustrates a menu that is displayed when the user is determined to be a driver or a user with a low distraction level. Display 301 has few options and those options are limited to simple interactions, such as selecting a radio band or a navigation system. Display 302 illustrates a menu that is displayed when the user is determined to be a passenger or other user with a high distraction level. Display 302 provides a more detailed menu with more complex options.

The selection of menu items to display to each user is controlled by an interaction set. Once that user is identified as a driver or passenger, the appropriate interaction set for that user is activated. The user may be identified automatically by the device using any of the sensors described herein or the user may self-identify in some embodiments. The ability to self-identify may be limited under certain conditions, such as when the vehicle is moving or stopped or if the engine is running or off.

Additionally, there may be sub-sets of each interaction set or alternative interaction sets for each user or group of users. The sub-set interaction set or alternative interaction set may consist of a modified group of interactions that are selected under different vehicle operating conditions.

Under some conditions, both the driver and passenger may be assigned the same interaction set. For example, when the engine is off both users may be assigned a complex interaction set so that they are both are shown display 302. However, when the engine is running, the users are assigned separate interaction sets that limit the driver to display 301 but allow the passenger to continue using display 302.

In addition to selecting the menu items and arrangement, the interaction sets assigned to each user may also define screen flows or other actions that occur when a user selects a displayed menu item. For example, if the driver selects satellite radio button 303, he or she may be shown a limited selection of preset channel buttons. If the passenger selects satellite radio button 304, he or she may be shown search features, channel categories, detailed channel information, and other information and options in addition to the preset channel buttons. Although the above examples refer to a device such as a navigation or infotainment system in a vehicle, it will be understood that the methods and techniques described herein may be applied to any device without regard to whether it is associated with a vehicle.

A touch interface, such as a touch screen, track pad, or keypad, may provide different user interface elements to different users based upon their position relative to the touch interface. A display screen may be configured to present different images—or different user interfaces—to different users based on their position relative to the display. For example, a user to the left of the display may see a different image or interface than a user to the right of the display. This may result in different user interface elements that are directed at different users may be displayed in the same general physical area of the display. Skeletal tracking or other user-location sensors may be used to determine and disambiguate which user interface element was touched. For example, skeletal tracking may determine if a left-side user (e.g., driver) or right-side user (e.g., passenger) touched the display screen. This user identification can then be correlated to the appropriate user interface that has been generated for that user to determine what input was intended.

Figure 4:
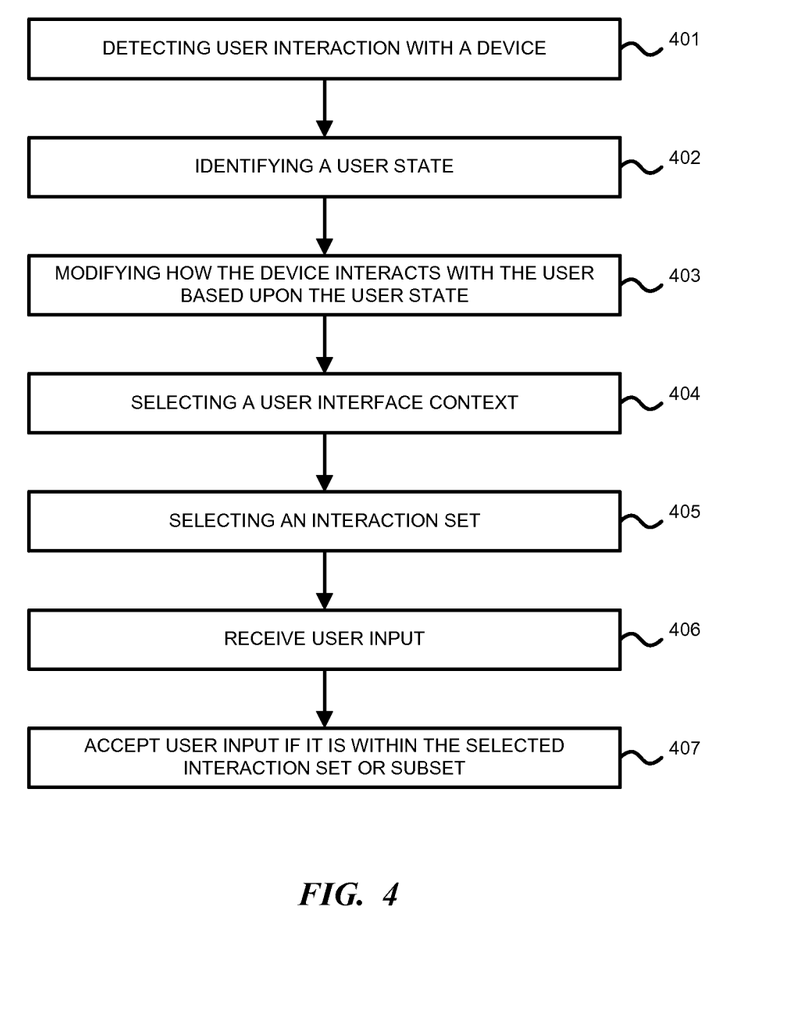
FIG. 4 is a flowchart illustrating a process or method for controlling interaction with a device based on user state.

FIG. 4 is a flowchart illustrating a process or method for controlling interaction with a device based on user state. In step 401, user interactions with a device are detected. These interactions may be, for example, providing an input to the device, such as pressing a button, speaking a command, gesturing at the device, or looking at the device. In step 402, a user state is identified. The user state may be, for example, a location, a position relative to the device, an identity, a physical or physiological condition of the user, or an assigned user task or responsibility. One or more sensors may be used to identify the user state. The sensors may be, for example, cameras, microphones, acoustic sensors, sonar sensors, radar sensors, light sensors, electronic device detectors, skeletal tracking devices, and user physiological sensors.

In step 403, the device modifies how it interacts with the user based upon the user state. In step 404, the device modifies how it interacts with the user by selecting a user interface context. The user interface context may be selected from one or more of a user interface menu, a screen flow, an arrangement of user interface components, a menu order, a language model, and a group of inputs on a display.

In step 405, the device modifies how it interacts with the user by selecting an interaction set. The interaction set defines one or more allowed interactions between the user and the device. The allowed interactions may be, for example, grammars used to interpret user speech inputs, vocabularies for text-to-speech outputs, gestures, human-machine interface, display buttons, display menus, display icons, and screen ordering. In other embodiments, the interaction set is a user physiological set that is used to monitor physiological factors of the user.

In other embodiments, the device modifies how it interacts with the user by disabling one or more device capabilities. The device capabilities may be, for example, one or more of functions, displays, buttons, menus, speakers, inputs, and outputs. The device may also modify how it interacts with the user by selecting a subset of all available user interactions as allowed inputs and outputs for the device.

In step 406, the device receives a user input, such as by using one of the sensors described above. In step 407, the device accepts the user input if it is within the selected interaction set or subset.

Figure 5:
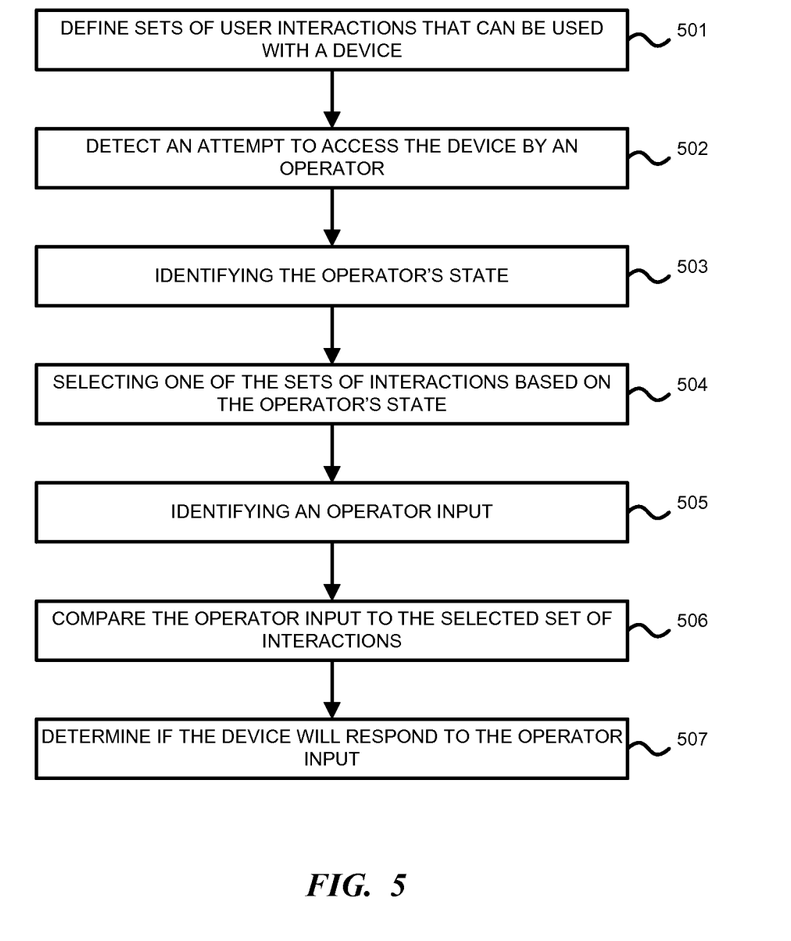
FIG. 5 is a flowchart illustrating a method or process for interacting with a device based upon user state.

FIG. 5 is a flowchart illustrating a method or process for interacting with a device based upon user state. In step 501, sets of interactions that can be used with a device are defined. Each set of interactions are associated with a particular state of an operator. The state of the operator may be a position of the operator relative to the device, for example. The sets of interactions may include, for example, speech inputs, gesture inputs, action inputs, human interface device inputs, or user physiological inputs.

In step 502, an attempt to access the device by an operator is detected. In step 503, the operator's state is identified. The operator's state may be determined, for example, using one or more of skeletal tracking, weight sensors, video sensors, light sensors, audio sensors, acceleration sensors, electronic device sensors, sonar, and radar.

In step 504, one of the sets of interactions is selected based upon the operator's state. In step 505, an operator input is identified. In step 506, the operator input is compared to the selected set of interactions. In step 507, the device determines if it will respond to the input. In one embodiment, the device allows the operator to interact with the device using the selected set of interactions and no other inputs for a predetermined period.

It will be understood that steps 401-407 of the process illustrated in FIG. 4 and steps 501-507 of the process illustrated in FIG. 5 may be executed simultaneously and/or sequentially. It will be further understood that each step may be performed in any order and may be performed once or repetitiously.

Figure 6:
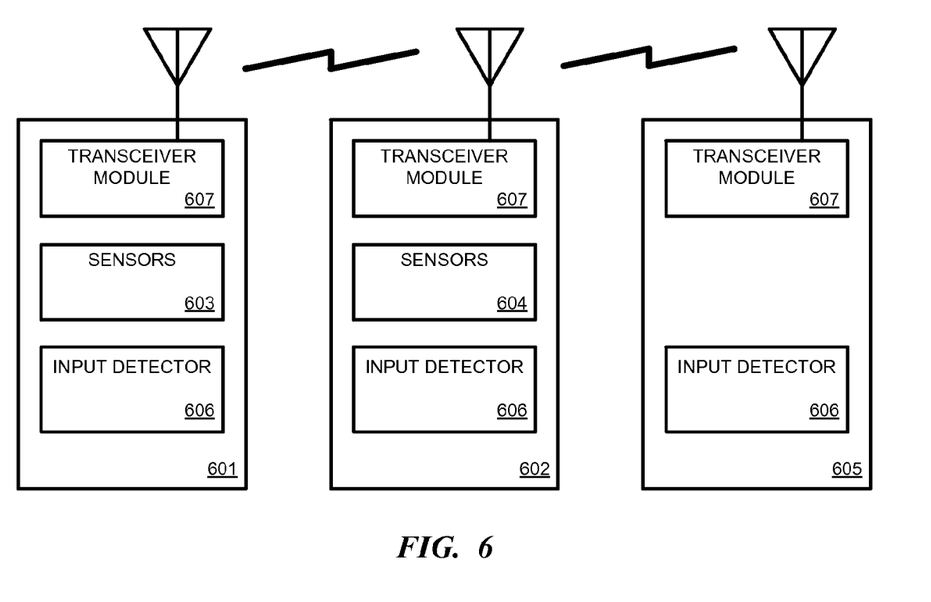
FIG. 6 is a block diagram illustrating multiple devices sharing sensor data.

FIG. 6 is a block diagram illustrating multiple devices sharing sensor data. Devices 601 and 602 both include sensors 603 and 604, respectively. Device 605 does not have its own sensors. Each device 601, 602, 605 has one or more input detectors 606. The input detectors on each device may be adapted for the same type of input, such as speech, gestures or motions, or each device may have a different type of input detector. The devices 601, 602, 605 also have a transceiver module 607 that allows the devices to communicate with each other wirelessly using any appropriate communication technology, protocol, or standard, such as Bluetooth®, WiFi, infrared, or cellular radio technology.

Transceivers 607 allow the devices to exchange sensor information and input information among other data. The devices may cooperatively use the gaze and/or input information. For example, device 601 may be a smartphone, device 602 may be a tablet computer, and device 605 may be an electronic book. Each device may belong to the same user. Smartphone 601 and tablet computer 602 both have cameras and, therefore, can process images of the user to generate user state information. These devices, 601 and 602, can use their own user state information to select the appropriate interaction set for input detectors 606.

Additionally, devices 601 and 602 can exchange user state information to assist the devices in generating or clarifying the user state. For example, if the user is holding device 601, then sensor 603 should identify the user's location with respect to device 601. Sensor 604 should determine that device 602 is not currently being held by the user. Device 601 may send a signal that indicates it is the device currently being used (e.g., "holding me") or contains specific user state information, such as a user position, user identity, location relative to the device, or direction the user is looking. Device 602 may send a signal indicating that it is not currently being used (e.g., "not looking at me") buy may include specific user state information if known. When device 601 also detects an input, such as a spoken command, gesture, or other action, it will react to the input because it knows that it is currently in use (and has confirmation from device 602 that it is not being used). Similarly, device 602 may detect the input for device 601 and should not respond to the input because it has determined that it is not currently in use (and has confirmation from device 601 that it is in use).

Device 605, which does not have its own sensor capability, may rely upon use state information from devices 601 and 602 to determine whether it should respond to detected inputs. For example, the devices may be linked and may be aware of each other. When device 605 receives signals from devices 601 and 602 that they are currently in use, then device 605 may assume that it is being used and may respond to any detected inputs. Alternatively, devices 601 and/or 602 may send specific user state information to device 605, such as a user position, location relative to device 605, or point of focus, or direction the user is looking. This specific gaze information may allow device 605 to determine that it is in fact in use. For example, the specific user state information may be related to a common reference point, GPS coordinates, or other data that allows device to match the user's position to its own position.

In other embodiments, multiple devices 601, 602, and 605 belong to different users. For example, multiple users in a car may each have a smartphone, PDA, or tablet computer. Each device may be used as a sensor and may cooperate with the other users' devices and/or an in-vehicle infotainment system to determine a user state and to select the appropriate interaction set for input detectors 606.

The following non-limiting examples illustrate different embodiments of systems that may incorporate user state information to control interaction with a device.

In a first non-limiting example, a vehicle has an infotainment system. As used herein, the term infotainment system refers to a system that provides information, such as navigation and telematics data, and entertainment, such as music, video, radio and other media, using displays, speakers or other inputs/outputs. There is a driver in the vehicle and a passenger traveling with the driver. The system allows for the driver to minimally interact with the system when the driver touches the screen. For example, the ability to input a destination may be turned off when the driver attempts to touch the screen. However, if the passenger interacts with the infotainment system, the passenger can input a destination and perform additional complex tasks.

In a variation of the first non-limiting example, a driver and passenger are in a vehicle that allows the infotainment system to pair to a smartphone. However, the passenger is a minimal user of technology and does not use advanced features on their smartphone, such as integration with social network accounts. When the passenger interacts with the system, the system's policy settings remove display elements that are not important or enabled by the passenger. So, even though these options are available under a standard passenger interaction set, certain features are not available to this passenger. This policy would limit user interface saturation and allows for intelligent adjustment of interaction sets.

In a further variation of the first non-limiting example, the there is no passenger in the vehicle. The driver attempts to trick the system by reaching around from the passenger seat to press buttons on the infotainment display so that it looks like a passenger is interacting with the device. However, the system sensors, such as camera, weight, seat belt, and/or skeletal tracking sensors, have detected that there is no passenger. Thus, the device determines that the driver is trying to interact with the system and only presents options and interactions according to the policies and interaction set for the driver. This would also occur if a passenger was actually present because the skeletal tracking system would recognize when the driver is attempting to reach over and interact from the passenger's position. Seatbelt and weight sensors detect if there is a person in the passenger seat and assist in the determination that the driver is reaching over to the passenger side. If there is no weight in the passenger seat, then all passenger usable functions may be disabled. If there is weight in the passenger seat, then the cameras/skeletal tracking system are used to determine if the passenger is actually present and actively interacting with the system. Weight and other sensors in the driver's seat may be used to detect the driver's weight shifting in a manner that corresponds to the shifting of body weight by a driver attempting to reach over and use the system from the other position.

In a second non-limiting example, a user—either the driver or passenger—is interacting with the vehicle infotainment system while the vehicle is in motion. When the car is in motion, the system uses a simpler grammar set. This minimizes voice command recognition errors since poor recognition rates would decrease the driver's ability to focus on the road. For example, when the vehicle is in motion, the driver cannot enter a new navigation address using the speech engine. Additionally, the system may adjust the grammar set for the passenger to include the ability to confirm or type in changes to the speech recognition output.

In a variation of the second non-limiting example, the passenger is not in the vehicle. In this case, the system allows the user to input navigation destinations into their device using voice commands, but does not allow manual input or interactions on the display screen.

In a further variation of the second non-limiting example, there may be a child as a backseat passenger. When the child attempts to use an active phone grammar from the back seat, device recognition may be disabled based on a child-passenger policy. However, when an entertainment application is activated by the driver or front seat passenger, grammars and gestures based on skeletal tracking are activated specifically for use by the backseat passenger or child. These interaction sets may ignore driver and front seat passenger speech and gestures for grammar processing.

In a third non-limiting example, an infotainment system in a vehicle is operating in a standby mode. When the system detects that the driver gazes as the infotainment screen, the system uses an interaction set that ensures that the display is simple and only shows important information, such as a next turn, compass, call state, next appointment, and the like. When the system detects that the passenger gazes at the screen, the system provides a richer experience that includes information that is not shown to the driver, such as social media check-in status, weather map overlays, appointment calendar entries, and the like. This allows a more distracting or feature rich experience for the passenger, but not for the driver.

Referring again to FIG. 1 and other embodiments disclosed herein, system 101 is only one example of a suitable environment for implementing interaction sets based on user state and is not intended to suggest any limitation as to the scope of use or functionality of the invention. The invention is operational with numerous other general purpose or special purpose computing system environments or configurations. Examples of well-known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

An exemplary system for implementing various aspects of the invention may include a general purpose computing device in the form of a computer. Components may include, but are not limited to, various hardware components, such as a processing unit, data storage, such as a system memory, and a system bus that couples various system components including the data storage to the processing unit. The system bus may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer typically includes a variety of computer-readable media. Computer-readable media may be any available media that can be accessed by the computer and includes both volatile and nonvolatile media, and removable and non-removable media, but excludes propagated signals. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media. Computer-readable media may be embodied as a computer program product, such as software stored on computer storage media.

The data storage or system memory includes computer storage media in the form of volatile and/or nonvolatile memory such as read only memory (ROM) and random access memory (RAM). A basic input/output system (BIOS), containing the basic routines that help to transfer information between elements within the computer, such as during start-up, is typically stored in ROM. RAM typically contains data and/or program modules that are immediately accessible to and/or presently being operated on by a processing unit. By way of example, and not limitation, data storage holds an operating system, application programs, and other program modules and program data.

Data storage may also include other removable/non-removable, volatile/nonvolatile computer storage media. By way of example only, data storage may be a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The drives and their associated computer storage media provide storage of computer-readable instructions, data structures, program modules and other data for the computer.

A user may enter commands and information through a user interface or other input devices such as a tablet, electronic digitizer, a microphone, keyboard, and/or pointing device, commonly referred to as mouse, trackball or touch pad. Other input devices may include a joystick, game pad, satellite dish, scanner, or the like. Additionally, voice inputs, gesture inputs using hands or fingers, or other natural user interface (NUI) may also be used with the appropriate input devices, such as a microphone, camera, tablet, touch pad, glove, or other sensor. These and other input devices are often connected to the processing unit through a user input interface that is coupled to the system bus, but may be connected by other interface and bus structures, such as a parallel port, game port or a universal serial bus (USB). A monitor or other type of display device is also connected to the system bus via an interface, such as a video interface. The monitor may also be integrated with a touch-screen panel or the like. Note that the monitor and/or touch screen panel can be physically coupled to a housing in which the computing device is incorporated, such as in a tablet-type personal computer. In addition, computers such as the computing device may also include other peripheral output devices such as speakers and printer, which may be connected through an output peripheral interface or the like.

The computer may operate in a networked or cloud-computing environment using logical connections to one or more remote devices, such as a remote computer. The remote computer may be a personal computer, a server, a router, a network PC, a peer device or other common network node, and typically includes many or all of the elements described above relative to the computer. The logical connections may include one or more local area networks (LAN) and one or more wide area networks (WAN), but may also include other networks. Such networking environments are commonplace in offices, enterprise-wide computer networks, intranets and the Internet.

When used in a networked or cloud-computing environment, the computer may be connected to a public or private network through a network interface or adapter. In some embodiments, a modem or other means for establishing communications over the network. The modem, which may be internal or external, may be connected to the system bus via a network interface or other appropriate mechanism. A wireless networking component such as comprising an interface and antenna may be coupled through a suitable device such as an access point or peer computer to a network. In a networked environment, program modules depicted relative to the computer, or portions thereof, may be stored in the remote memory storage device. It may be appreciated that the network connections shown are exemplary and other means of establishing a communications link between the computers may be used.

What is claimed is:

1. A method, comprising:
performing a first detection of a first user's interaction with a device within a vehicle, wherein the first user is a not a driver of the vehicle;
identifying a state of the first user;
making a first set of commands available to the first user based, at least in part, upon a first distraction level associated with the first user's state, wherein the first set of commands includes two or more commands;
performing a second detection of a second user's interaction with the device, wherein the second user is a not a driver of the vehicle, and wherein a second user's position relative to the first user does not change between the first detection and the second detection;

identifying a state of the second user; and making a second set of commands available to the second user based, at least in part, upon a second distraction level associated with the second user's state, wherein the first set of commands is a non-empty subset of the second set of commands, and wherein the distraction level of the second user is greater than the distraction level of the first user.

2. The method of claim 1, wherein the first and second users' states include the first and second users' respective positions relative to the device.

3. The method of claim 1, further comprising using one or more sensors configured to identify the users' states.

4. The method of claim 3, wherein the one or more sensors are selected from the group consisting of: a camera, a microphone, an acoustic sensor, a sonar sensor, a radar sensor, a light sensor, an electronic device detector, a skeletal tracking device, and a user physiological sensor.

5. The method of claim 1, further comprising providing a first graphical user interface to the first user based upon the first user's status and providing a second graphical user interface to the second user based upon the second user's status, wherein the first graphical user interface has fewer graphical features than the second user interface.

6. The method of claim 5, wherein the graphical features are selected from the group consisting of: a user interface menu, a screen flow, an arrangement of user interface components, a menu order, or a group of inputs on a display.

7. The method of claim 1, wherein making the first set of commands available to the first user further comprises selecting a first interaction set from a plurality of interaction sets, the first interaction set defining two or more allowed interactions between the first user and the device, and wherein making the second set of commands available to the second user comprises selecting a second interaction set from the plurality of interaction sets, the second interaction set defining one or more other different interactions between the second user and the device.

8. The method of claim 1, wherein identifying the state of the first user includes identifying the first user as a front-seat passenger, and wherein identifying the state of the second user includes identifying the second user as a backseat passenger.

9. The method of claim 7, wherein the first and second interaction sets include physiological sets used to monitor physiological factors of the first and second users.

10. The method of claim 1, further comprising
disabling one or more device capabilities in response to the state of the first user.

11. The method of claim 1, wherein the identifying the state of the first user includes identifying the first user as a child passenger, and wherein identifying the state of the second user includes identifying the second user as an adult passenger.

12. The method of claim 1, further comprising determining that the first user is attempting to assume the status of the second user between the first detection and the second detection, and maintaining the first set of commands available to the first user.

13. A method, comprising:
defining sets of interactions that can be used with a device within a vehicle, each set of interactions associated with a particular state of one of a plurality of operators allowed to access the device;
performing a first detection of an attempt to access the device by a first one of the plurality of operators;
identifying a state of the first operator as an adult passenger;
selecting a first one of the sets of interactions based upon the first operator's state;
performing a second detection of an attempt to access the device by a second one of the plurality of operators, wherein the first and second operator states include the first and second operator's respective positions relative to the device;
identifying a state of the second operator as a child passenger, wherein the first and second operator's respective positions relative to the device do not change between the first and second detections; and
selecting a second one of the sets of interactions based upon the second operator's state, wherein the first set of interactions is a non-empty subset of the second set of interactions, and wherein the state of the first operator and the state of the second operator indicate the first operator is more distracted than the second operator.

14. The method of claim 13, further comprising:
identifying a second operator's input;
providing a first response to the second operator's input;
identifying a first operator's input, wherein the first operator's input includes a same instruction as the second operator's input; and
providing a second response to the first operator's input, wherein the second response is different from the first response.

15. The method of claim 13, wherein the sets of interactions comprise one or more of: speech inputs, gesture inputs, action inputs, human interface device inputs, or user physiological inputs.

16. The method of claim 13, wherein the operator's state is determined using one or more of: skeletal tracking, weight sensors, video sensors, light sensors, audio sensors, acceleration sensors, electronic device sensors, sonar, or radar.

17. The method of claim 13, further comprising:
allowing the first operator to interact with the device using the first set of interactions and no other inputs for a predetermined period of time.

18. A device disposed within a motor vehicle, the device comprising:
a user interface configured to receive user inputs;
one or more sensors configured to determine a user's position within the motor vehicle; and
a user-interface controller coupled to the user interface and to the one or more sensors, the user-interface controller configured to:
modify the user interface to make available a first set of selected inputs based upon a first user's position within the motor vehicle indicating that the first user is a front-seat passenger; and
modify the user interface to make available a second set of selected inputs based upon a second user's position within the motor vehicle indicating that the second user is a backseat passenger, wherein the first set of selected inputs is a non-empty subset of the second set of selected inputs.

19. The device of claim 18, the user-interface controller further configured to modify the user interface to make available a third set of selected inputs based upon a third user's position within the motor vehicle, wherein the third set of inputs includes fewer inputs than the first set of inputs.

* * * * *